United States Patent
Huck

(10) Patent No.: US 6,704,833 B2
(45) Date of Patent: Mar. 9, 2004

(54) ATOMIC TRANSFER OF A BLOCK OF DATA

(75) Inventor: Jerome C. Huck, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 12 days.

(21) Appl. No.: 10/038,551

(22) Filed: Jan. 4, 2002

(65) Prior Publication Data

US 2003/0131205 A1 Jul. 10, 2003

(51) Int. Cl.[7] ............................................. G06F 12/00
(52) U.S. Cl. ..................... 711/3; 711/141; 711/201; 711/220; 712/203; 712/210
(58) Field of Search ............... 711/3, 123, 129, 711/141, 170, 201, 208, 220; 712/203, 210

(56) References Cited

U.S. PATENT DOCUMENTS

| | | | | | |
|---|---|---|---|---|---|
| 5,586,297 A | * | 12/1996 | Bryg et al. | ................. | 711/143 |
| 5,642,324 A | * | 6/1997 | Ghosh et al. | .......... | 365/230.03 |
| 5,644,753 A | * | 7/1997 | Ebrahim et al. | ............ | 711/131 |
| 5,841,973 A | * | 11/1998 | Kessler et al. | ............... | 709/250 |
| 5,996,042 A | * | 11/1999 | Pawlowski et al. | ......... | 711/105 |
| 6,073,211 A | * | 6/2000 | Cheng et al. | ............... | 711/122 |
| 6,189,077 B1 | * | 2/2001 | Robertson et al. | .......... | 711/149 |
| 6,502,170 B2 | * | 12/2002 | Zahir | ......................... | 711/141 |
| 6,556,952 B1 | * | 4/2003 | Magro | ........................ | 702/183 |

* cited by examiner

*Primary Examiner*—Donald Sparks
*Assistant Examiner*—Christian P. Chace

(57) ABSTRACT

A method for transferring data between a processor and a memory includes (A) executing, at the processor, an instruction that includes (i) a specifier of a location in a storage resource local to the processor, (ii) a specifier of an address in the memory, and (iii) a specifier of a size of a data block, (B) providing, from the processor to a controller, a set of control signals indicating (i) the address in the memory, and (ii) the size of the data block; and (C) transferring, by the controller, in response to receipt of the set of control signals, the data block atomically between the storage resource and the memory, without the processor having to first request a lock on the memory.

16 Claims, 3 Drawing Sheets

ATOMIC TRANSFER OF A BLOCK OF DATA

BACKGROUND OF THE INVENTION

1. Field of the Invention

The present invention relates to a main memory of a computer system, and more particularly, a technique for an atomically reading data from, and writing data to, the main memory.

2. Description of the Prior Art

Data is conventionally stored in a computer memory in a unit of data known as a word. A traditional computer system updates the memory with a quantity of data that is related to the natural width of a word of the memory. That is, the size of the update is related to the width of the word. For example, in a particular reduced instruction set computer (RISC), the general-purpose registers are 64-bits wide, and thus the RISC machine allows writing of 64-bits of data.

An atomic data transfer is one in which an entire block of data is read from a memory to a first processor, or written from the first processor to the memory, as a unit, without interference from a second processor. That is, all bytes of the data are transferred between the first processor and the memory without interference from the second processor. Traditional architectures allow a transfer of a quantity of data greater than that of the natural width, but such a transfer is not guaranteed to be atomic.

The prior art technique for attempting to ensure an atomic transfer of data is for a processor to acquire "a lock" on a memory. This is achieved by executing three transactions between the processor and a memory controller for the memory. The first transaction is a command from the processor that sets a lock indicator, i.e., a flag, and an address to which the data is to be written or from which the data is to be read. The quantity of data to be transferred is of a predetermined block size. The second transaction is the transmission of the data between the processor and the memory controller. The third transaction releases the lock to allow other processors to access the lock.

Even if a prior art memory system permits an atomic access thereof, it is not possible for an instruction stream to control the atomic transfer. This prior art is fully effective only if all programs that are executed by all processors that access the memory are written to honor the lock. That is, a program that fails to honor the lock can interfere with an in-progress transfer of data. Also, because the quantity of data to be written is of a predetermined block size, this technique offers no flexibility in the size of the transfer.

A traditional system cannot perform an atomic transfer from the instruction stream because instruction sets historically did not provide atomic transfer instructions nor were memory systems with cache subsystems capable of atomic transfers of greater than one word. Processors have previously not provided unconstrained multi-word atomic update instructions because it is costly in hardware and lacks scalability. That is, as more processors are added to a system, processing efficiency is adversely impacted.

SUMMARY OF THE INVENTION

It is an object of the present invention to provide a technique for enabling an atomic transfer of data between a processor to a memory.

It is another object of the present invention to enable such a transfer while permitting a flexible data block size.

These and other objects of the present invention are achieved by a method for transferring data between a processor that includes a cache and a memory comprising the steps of (A) executing, at the processor, an instruction that includes (i) a specifier of a location in a storage resource local to the processor, (ii) a specifier of an address in the memory, and (iii) a specifier of a size of a data block, (B) providing, from the processor to a controller, a set of control signals indicating (i) the address in the memory, and (ii) the size of the data block; and (C) transferring, by the controller, in response to receipt of the set of control signals, the data block atomically between the storage resource and the memory, without the processor having to first request a lock on the memory. The method is constrained to operations where the size of the data block is less than or equal to one cache-line size, the address in the memory is naturally aligned, and the memory is updated by a cache-line sized operation.

DETAILED DESCRIPTION OF THE INVENTION

The present invention provides for control of an atomic access from an instruction stream. The present invention involves an instruction or command, executed by a processor that in turn sends control signals to a memory controller to enable an atomic access to or from a main memory. The size of the access is permitted to be greater than the natural width of the main memory.

The source of data written from the processor to the main memory, or the destination of data read from the main memory to the processor, is a resource local to the processor. The local resource can be, for example, the general registers of the processor, or a set of special-purpose registers within the processor.

The present invention combines special constraints that greatly simplify building of the hardware processor while preserving the utility of the atomic transfer instruction. The constraints are (1) a processor with a cache memory, (2) a transfer size of one cache-line size or less, (3) address of a data block is naturally aligned and (4) main memory is only updated by cache-line sized operations, i.e., read or write.

Figure 1:
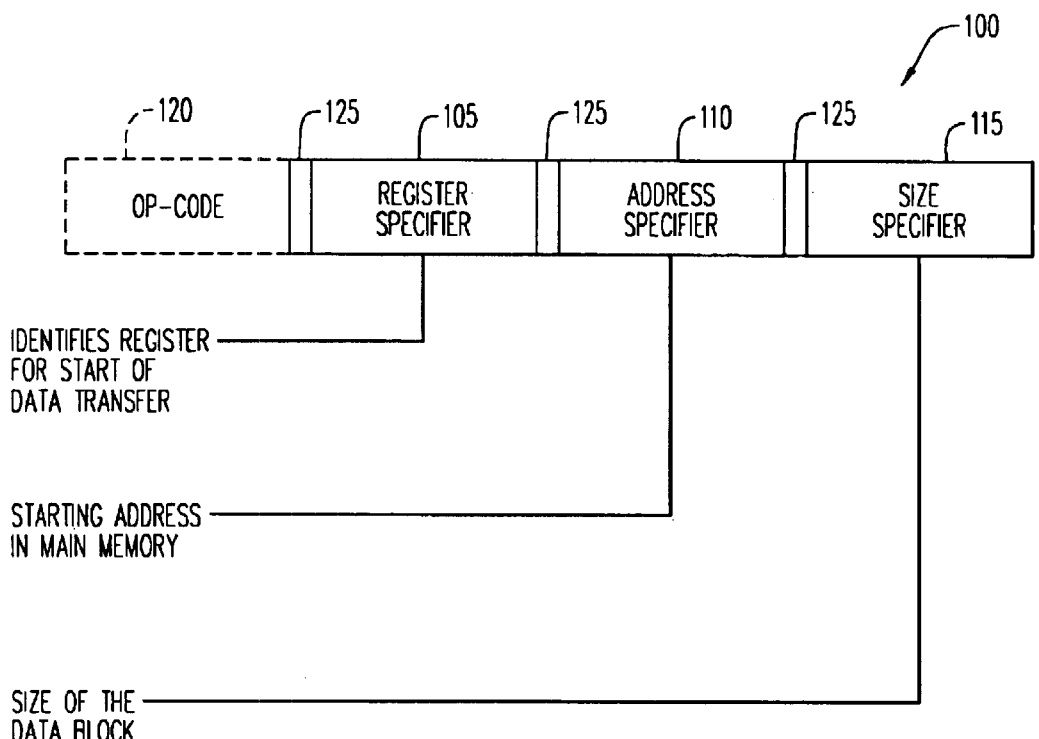
FIG. 1 is a conceptual representation of an instruction for transferring data between a processor and a memory in accordance with the present invention.

FIG. 1 is a conceptual representation of an instruction 100 for transferring data between a processor and a main memory in accordance with the present invention. Instruction 100 includes a register specifier field 105, an address specifier field 110, and a size specifier field 115. A specifier need not directly or literally provide data or a value for an underlying field, but instead, can provide or identify a resource or encoding from which the data or value for the underlying field can be derived. Note that the specifier fields 105, 110 and 115 do not need to be disposed in any particular order, and they are not necessarily contiguous. Other fields 125 may separate them.

Instruction 100 is executed by the processor, which in turn sends a set of signals to a controller in the main memory in order to effectuate the transfer of data. In an embodiment for writing data, instruction 100 causes an atomic transfer of data from the processor to the main memory. In an embodiment for reading data, instruction 100 causes an atomic transfer of data from the main memory to the processor. The embodiment for writing and the embodiment for reading can be distinguished from one another by way of different operational codes (op codes) 120 or by some other manner as is well understood in the art of data communication.

Register specifier field 105 identifies a register, within the processor, for a start of the atomic transfer of a block of data. For example, the register specifier can be a binary encoding of a register number. In the case of writing data from the processor to the main memory, register specifier field 105 identifies a register that contains the start of the block of data to be transferred. In the case of reading data from the main memory to the processor, register specifier field 105 identifies a register into which the start of the block of data will be transferred.

Address specifier field 110 identifies an address in the main memory at which the transfer will commence. For example, the address specifier can indicate a register that contains a memory address. In the case of writing data from the processor to the main memory, address specifier field 110 identifies the starting address to which the data block will be written. In the case of reading data from the main memory to the processor, address field 100 identifies the starting address from which the data block will be read. In either case, it is preferred that the starting address be a naturally aligned main memory address. For example, if the word size of data in the main memory is two bytes, then the starting address provided in address specifier field 110 would be at an integer multiple of two bytes.

Size specifier field 115 identifies the size of the block of data to be transferred. The size specifier can be provided as a binary encoding of a number of bytes to be transferred. As a first example, a size specifier of a binary value of $10000_2$ (i.e., $32_{10}$), can indicate a block size of 32 bytes. As a second example, if one of four different block sizes are permitted, e.g., 4, 8, 16 or 32 bytes, then a two-bit field can serve to specify one of the four sizes. In accordance with the present invention, the size of the data block is permitted to be greater than the width of a word, i.e., the natural word size, of the main memory. For example, if the natural word size of data in the main memory is two bytes, then the size provided in size specifier field 115 is permitted to be greater than two bytes. In a preferred embodiment, the size of the data block is an integer multiple of the natural word size.

Thus, register specifier field 105 and size specifier field 115 together specify a block of registers within a processor. In a practical implementation, size specifier field 115 would be restricted to some maximum length, for example, 16, 32 or 64 bytes. In a computer with a 64-bit architecture, and 8 bytes per register, these lengths would correspond to 2, 4 and 8 registers, respectively.

Figure 2:
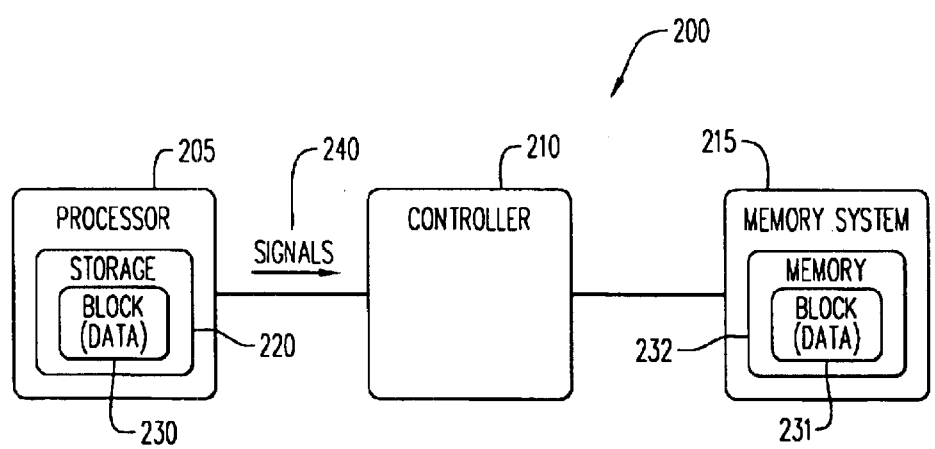
FIG. 2 is a block diagram of a computer system suited for employment of the present invention.

FIG. 2 is a block diagram of a computer system 200 suited for employment of the present invention. The principal components of system 200 are a processor 205, a controller 210 and a memory system 215. Processor 205 includes a local data storage 220, and memory system 215 includes a memory 232.

Controller 210 controls access to memory system 215 by processor 205. That is, when processor 205 wishes to access memory system 215, it must do so via controller 210.

Processor 205 executes an instruction as described earlier and illustrated in FIG. 1. The instruction is for an atomic transfer between processor 205 and memory system 215. The instruction can be either a write instruction or a read instruction. The size of the data being transferred is permitted to be greater than the width of a word of memory 232.

To effectuate the transfer, processor 205 issues a set of signals 240 to memory controller 210 to control the read or write operation. In a case of a write operation, a data block 230 is atomically transferred from storage 220 to memory 232, where it is written as data block 231. In the case of a read operation, data block 231 is read from memory 323 and transferred to processor 205. In either case, the transfer is accomplished without processor 205 having to first acquire a lock on memory system 215.

Figure 3:
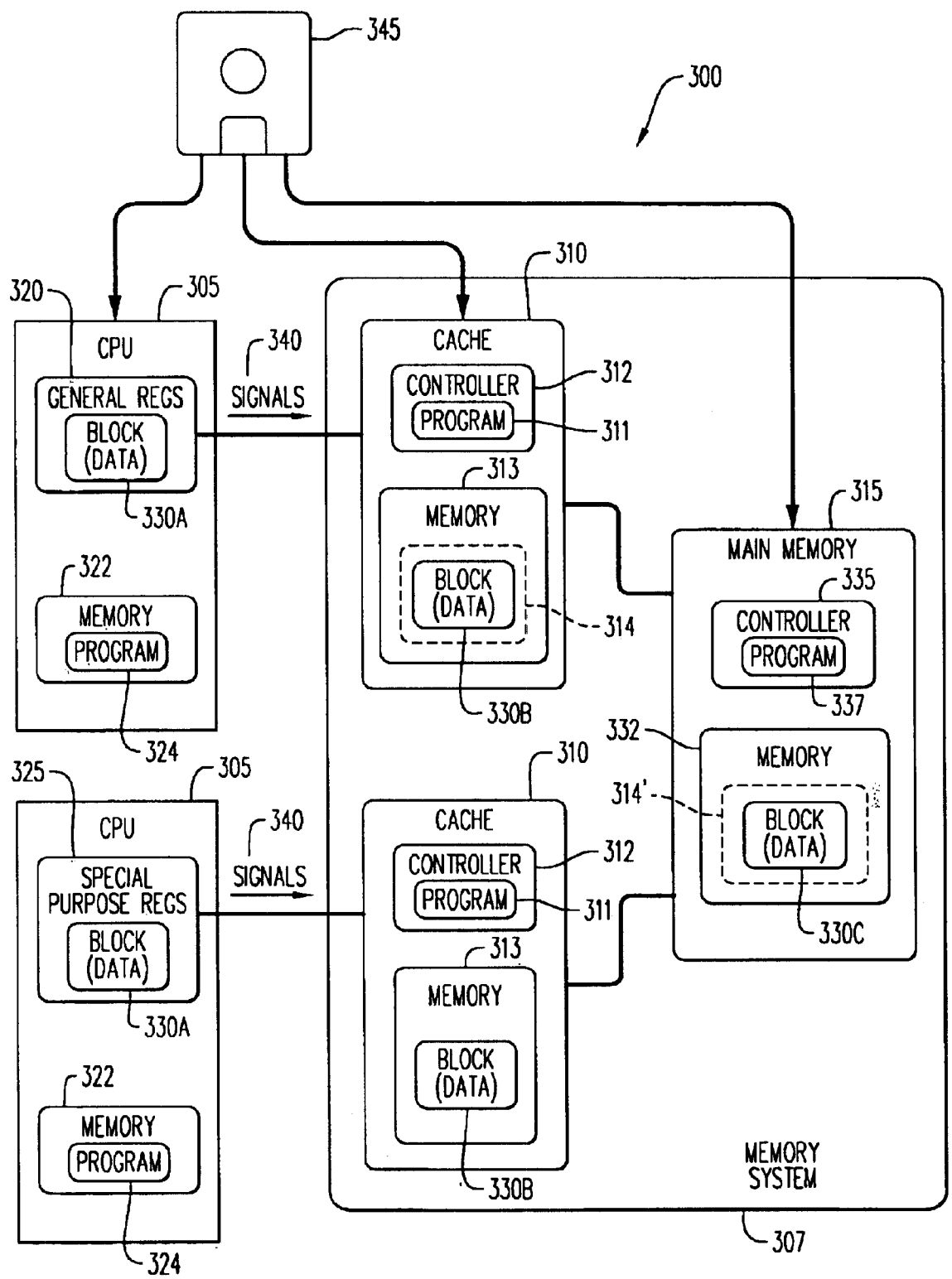
FIG. 3 is a block diagram of a preferred embodiment of a computer system configured for employment of the present invention.

FIG. 3 is a block diagram of a preferred embodiment of a computer system 300 configured for employment of the present invention. The principal components of computer system 300 include one or more processors, such as central processing units (CPU) 305, and a memory system 307.

Memory system 307 includes a main memory 315 and optionally, a data cache 310 associated with each CPU 305. Memory system 307 is not necessarily limited to a single main memory 315, but instead may be organized as a distributed memory or a hierarchical memory.

CPU 305 is a processor such as that found in a desktop personal computer (PC). CPU 305 can be a reduced instruction set computer (RISC) processor, and generally can be regarded as any processor in a device that requires access to main memory 315, such as, for example, an I/O adapter. CPU 305 includes some local storage, such as, a set of registers, which may be general-purpose registers 320 or special-purpose registers 325. CPU 305 may be implemented in hardware or firmware, or a combination thereof. Furthermore, it may include an associated memory 322 that contains instructions, i.e., program 324, for controlling CPU 305 when executing the method of the present invention.

Main memory 315 is a storage device such as a random access memory (RAM), a hard drive, a tape drive or an optical drive. A memory controller 335 controls access to main memory 315. Memory controller 335 may be located internal to main memory 315, as shown in FIG. 3, or external to main memory 315. Memory controller 335 may be implemented in hardware or firmware, or a combination thereof. Furthermore, it may include an associated memory that contains instructions, i.e., program 337, for controlling memory controller 335 when executing the method of the present invention.

CPU 305 issues a set of signals 340 to memory controller 335 that enables an atomic access of main memory 315. CPU 305 issues signals 340 as a result of its execution of an instruction as shown in FIG. 1 and described earlier. The instruction can be either a write instruction or a read instruction.

In the case of a write operation, a data block 330A is transferred from CPU 305 registers 320 or 325 to main memory 315, where the data is written as data block 330C into a memory 332. CPU 305 builds data block 330A in a local storage, e.g. registers 320 or 325. The size of data block 330A is permitted to be greater than the width of a word of main memory 315. CPU 305 then sends signals 340 to memory controller 335 to control the write operation. Signals 340 indicate:

(a) a starting address in main memory 315 to which the data block is to be written, e.g., the starting address for data block 330C; and (b) the size of data block 330A.

In response to receipt of signals 340, memory controller 335 stores the data block atomically to memory 332 as data block 330C, without CPU 305 having to first acquire a lock on main memory 315.

In the case of a read operation, data block 330C is read from main memory 315 and transferred to CPU 305 registers 320 or 325 as data block 330A. CPU 305 sends signals 340 to memory controller 335 to control the read operation. The size of data block 330C is permitted to be greater than the width of a word of main memory 315. Signals 340 indicate:

(a) a starting address in main memory 315 from which the data block is to be read, e.g., the starting address of data block 330C; and (b) the size of data block 330C.

Memory controller 335 receives signals 340 and responds by reading data block 330C atomically from memory 332, without CPU 305 having to first acquire a lock on main memory 315. Memory controller 335 sends data block 330C to CPU 305.

In practice, a series of memory access is likely to exist. That is, given a current transaction, there may exist a prior transaction and a subsequent transaction. Memory controller 335 first completes the prior transaction, if one exists, and then services and completes the current transaction before servicing the subsequent transaction.

Cache 310 may be interposed between CPU 305 and main memory 315. Although shown here as being integrated into memory system 307, and thus external to CPU 305, cache 310 may be located within CPU 305. Cache 310 includes a cache controller 312 and a cache memory 313. During a data transfer, the data block is temporarily stored as a data block 330B in cache memory 313. In the context of the present invention, the term "memory" refers to a component within which data can be stored, including, for example, memory 313 of cache 310 as well as memory 332 of main memory 315.

A cache-line is a basic quantity or amount of data that is fetched or stored in one cache operation. Preferably, the size of data block 330B is less than or equal to the size of a cache-line 314 of data cache 310. Accordingly, during the data transfer, cache controller 312 needs to update only one cache-line of cache 310. This is preferable to updating two or more cache-lines for each atomic transaction. Also, in the preferred embodiment, the data block falls within an address range of main memory 315 that is wholly contained within a single cache-line address range 314'.

A system such as computer system 300 that includes a plurality of CPUs 305, is known as a multiprocessor system. Multiprocessor systems with data caches 310 associated with each CPU 305 use some manner of protocol to manage the consistency (i.e., coherency) of the cached data 330B. One common approach is the use of a multiprocessor cache coherence algorithm, which is an ownership-based protocol that allows unmodified (i.e., clean) data to exist in multiple caches 310 at the same time. When a particular CPU 305 wishes to modify some data, the caches controllers 312 and memory controller 335 communicate to remove all the copies of the data and give the particular CPU 305 ownership of the data. The particular CPU 305, now the owning processor, can modify the data without any additional coordination. If another processor wishes to read or modify a line of cached data 330B, then the owning processor will give the modified line to the requesting processor. Many schemes exist to optimize the number of transactions, the time to coordinate, and other characteristics of maintaining cache coherency. All of these mechanisms attempt to preserve the illusion that all reads and modifications to memory appear in some order as though no cache existed. Hennessy and Paterson, "Computer Architecture A Quantitative Approach", published by Morgan Kauflnann, 1996 (ISBN 1-55860-329-8) provides an overview of cache coherence.

The present invention is useful for transferring blocks of data in a multiprocessor system without requiring traditional synchronization between the processor and main memory. In particular, the present invention eliminates the prior art requirement to lock access to a data block, update the data and then release the lock.

While the procedures required to execute the invention hereof are indicated as programs 311, 324 and 337, which are already loaded into system 300, they may be configured on a storage media 345, for subsequent loading into system 300. Storage media 345 may be any conventional data storage device such as, but not limited to, a magnetic disk, a magnetic tape, a read only memory, a random access memory, a hard disk or a floppy disk, or an optical storage media.

Figure 4:
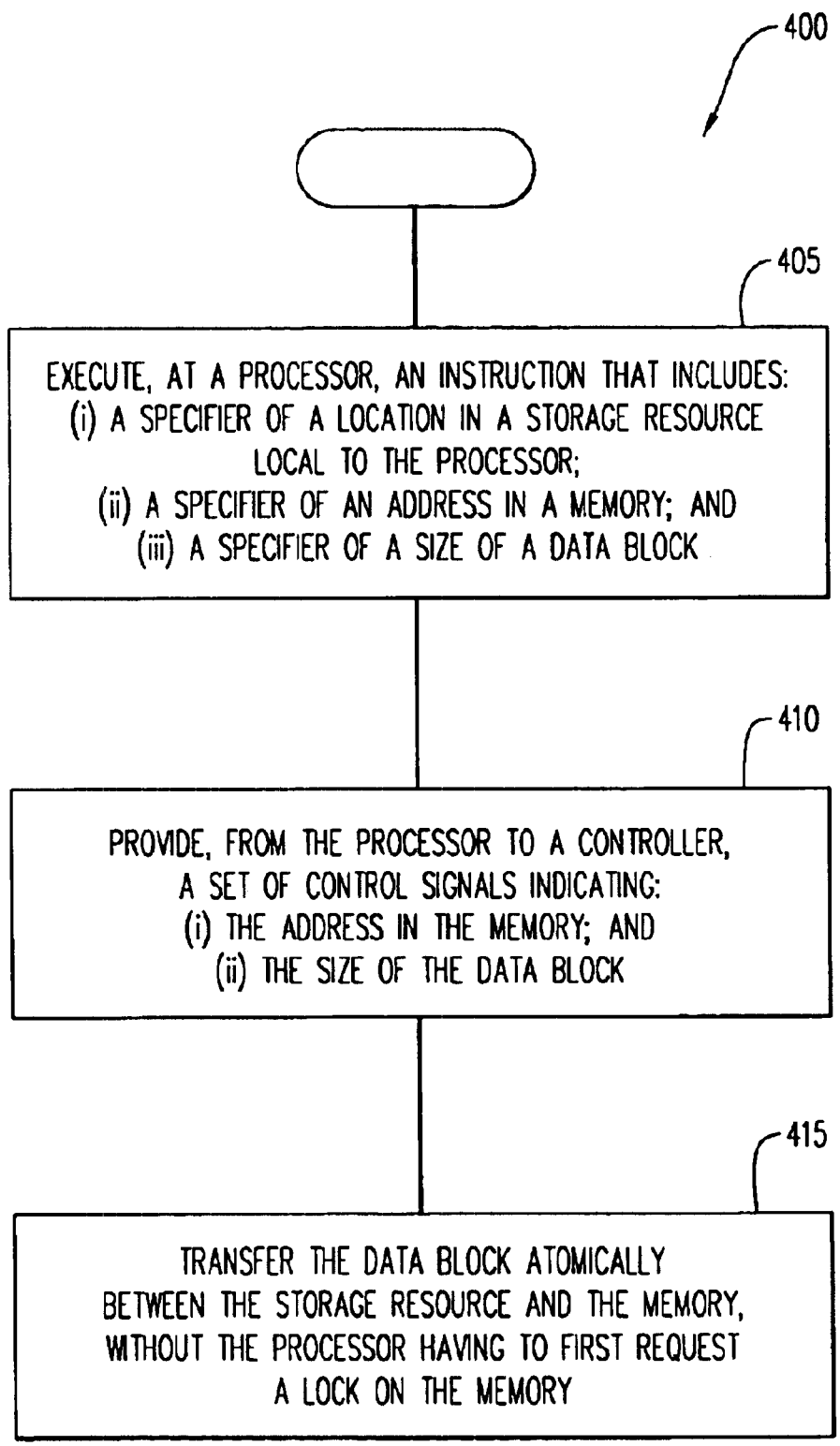
FIG. 4 is a flowchart of a method for transferring data between a memory and a processor, in accordance with the present invention.

FIG. 4 is a flowchart of a method 400 for transferring data between a memory and a processor, in accordance with the present invention. The method is described in the context of system 300 using instruction 100. Method 400 begins with step 405.

In step 405, processor 305 executes instruction 100, which includes (i) a specifier 105 of a location in a storage resource 320 or 325 local to processor 305, (ii) a specifier 110 of an address in memory 332, and (iii) a specifier 115 of a size of a data block. Method 400 then progresses to step 410.

In step 410, processor 305 provides to controller 335, a set of control signals 340 indicating (i) the address in memory 332, and (ii) the size of the data block. Method 400 then progresses to step 415.

In step 415, controller 335 transfers the data block atomically, in response to receipt of the set of control signals 340, between storage resource 320 or 325 and memory 332, without processor 305 having to first request a lock on memory 332. The size of the data block is less than or equal to one cache-line size. The address in memory 332 is naturally aligned, and memory 332 is updated by a cache-line sized operation.

It should be understood that the foregoing description is only illustrative of the invention. Various alternatives and modifications can be devised by those skilled in the art without departing from the invention. Accordingly, the present invention is intended to embrace all such alternatives, modifications and variances that fall within the scope of the appended claims.

What is claimed is:

1. A method for transferring data between a memory and a processor in a system that includes a cache, said method comprising the steps of:

executing, at the processor, an instruction that includes (i) a specifier of a location in a storage resource local to said processor, (ii) a specifier of an address in said memory, and (iii) a specifier of a size of a data block;

providing, from said processor to a controller, a set of control signals indicating (i) said address in said memory, and (ii) said size of said data block; and transferring said data block atomically, by said controller in response to receipt of said set of control signals, between said storage resource and said memory, without said processor having to first request a lock on said memory, wherein said size of said data block is less than or equal to one cache-line size, wherein said address in said memory is naturally aligned, and wherein said memory is updated by a cache-line sized operation.

2. The method of claim 1, wherein said instruction further includes a specifier of a direction of said transfer as one of either (i) from said processor to said memory, or (ii) from said memory to said processor, and
wherein said set of control signals further indicates said direction.

3. The method of claim 1, wherein said storage resource comprises a set of general-purpose registers of said processor.

4. The method of claim 1, wherein said storage resource comprises a set of special-purpose registers of said processor.

5. The method of claim 1, wherein said size of said data block is permitted to be greater than a width of said storage resource.

6. The method of claim 1,
wherein said memory is located within a data cache, and
wherein said controller executes a multiprocessor cache coherence algorithm to update data in said data cache.

7. The method of claim 1,
wherein said processor builds said data block at said location in said storage resource, and
wherein said transferring step transfers said data block from said processor to said memory.

8. The method of claim 1,
wherein said location in said storage resource is a first register of a set of registers, and
wherein said size of said data block specifies an extent of said set of registers.

9. A system for transferring data between a memory and a processor said system comprising:
a cache;
a processor for:
(A) executing an instruction that includes (i) a specifier of a location in a storage resource local to said processor, (ii) a specifier of an address in said memory, and (iii) a specifier of a size of a data block; and
(B) providing a set of control signals indicating (i) said address in said memory, and (ii) said size of said data block; and a controller for transferring, in response to receipt of said set of control signals, said data block atomically between said storage resource and said memory, without said processor having to first request a lock on said memory,
wherein said size of said data block is less than or equal to one cache-line size,
wherein said address in said memory is naturally aligned, and
wherein said memory is updated by a cache-line sized operation.

10. The system of claim 9,
wherein said instruction further includes a specifier of a direction of said transfer as one of either (i) from said processor to said memory, or (ii) from said memory to said processor, and
wherein said set of control signals further indicates said direction.

11. The system of claim 9, wherein said storage resource comprises a set of general-purpose registers of said processor.

12. The system of claim 9, wherein said storage resource comprises a set of special-purpose registers of said processor.

13. The system of claim 9, wherein said size of said data block is permitted to be greater than a width of said storage resource.

14. The system of claim 9,
wherein said memory is located within a data cache, and
wherein said controller executes a multiprocessor cache coherence algorithm to update data in said data cache.

15. The system of claim 9,
wherein said processor builds said data block at said location in said storage resource, and
wherein said transferring step transfers said data block from said processor to said memory.

16. The system of claim 9,
wherein said location in said storage resource is a first register of a set of registers, and
wherein said size of said data block specifies an extent of said set of registers.

* * * * *

UNITED STATES PATENT AND TRADEMARK OFFICE
CERTIFICATE OF CORRECTION

PATENT NO. : 6,704,833 B2  Page 1 of 1
DATED : March 9, 2004
INVENTOR(S) : Jerome C. Huck It is certified that error appears in the above-identified patent and that said Letters Patent is hereby corrected as shown below:

Column 7,
Line 35, after "processor" insert a comma

Signed and Sealed this

First Day of February, 2005

JON W. DUDAS
*Director of the United States Patent and Trademark Office*